Jan. 12, 1960 F. D. LAKINS ET AL 2,920,376
AUTOMATIC BAR WORKING MACHINE
Filed Dec. 12, 1957 3 Sheets-Sheet 1

INVENTOR.
Franklin D. Lakins
Gerald B. Lanphere
BY
D. Emmett Thompson
ATTORNEY.

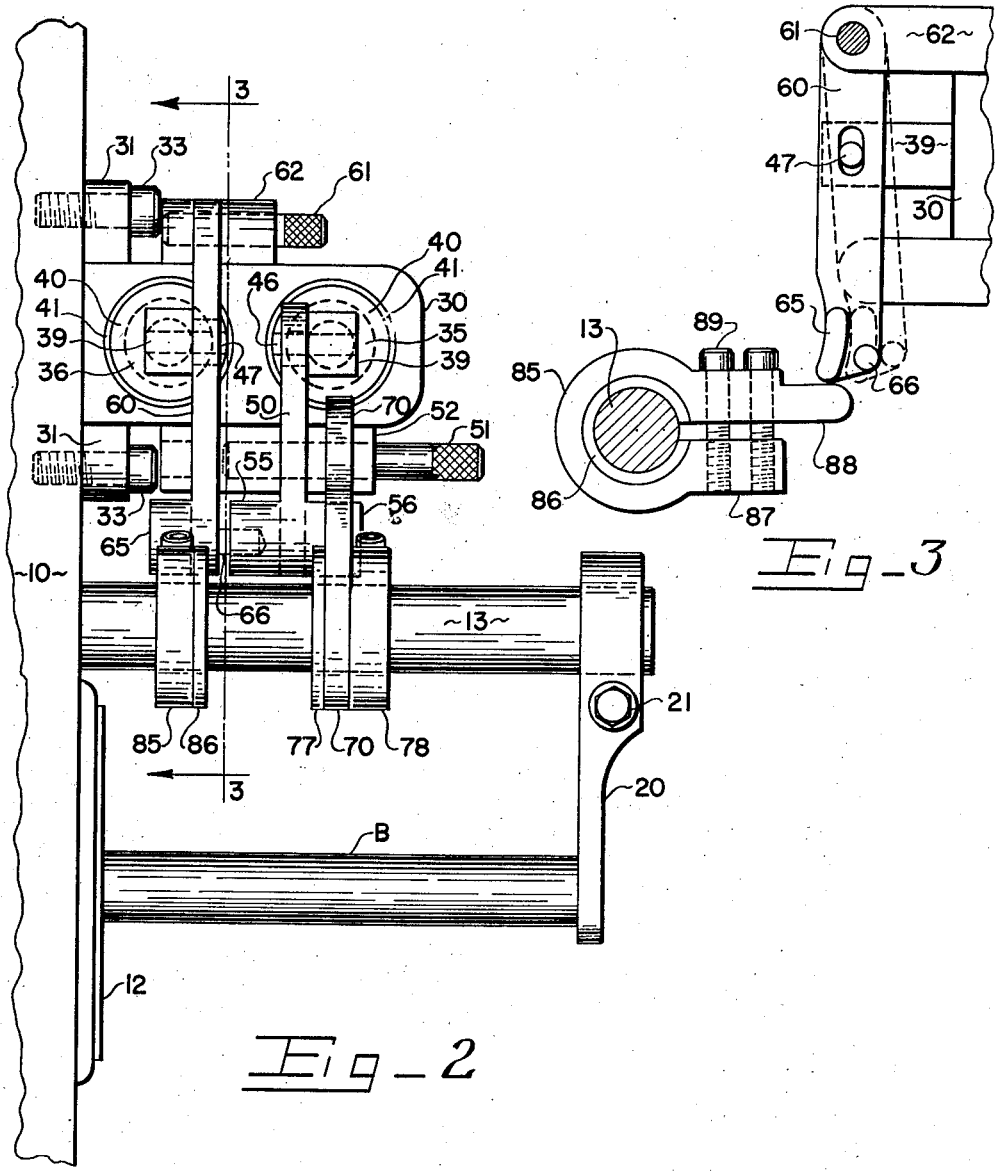

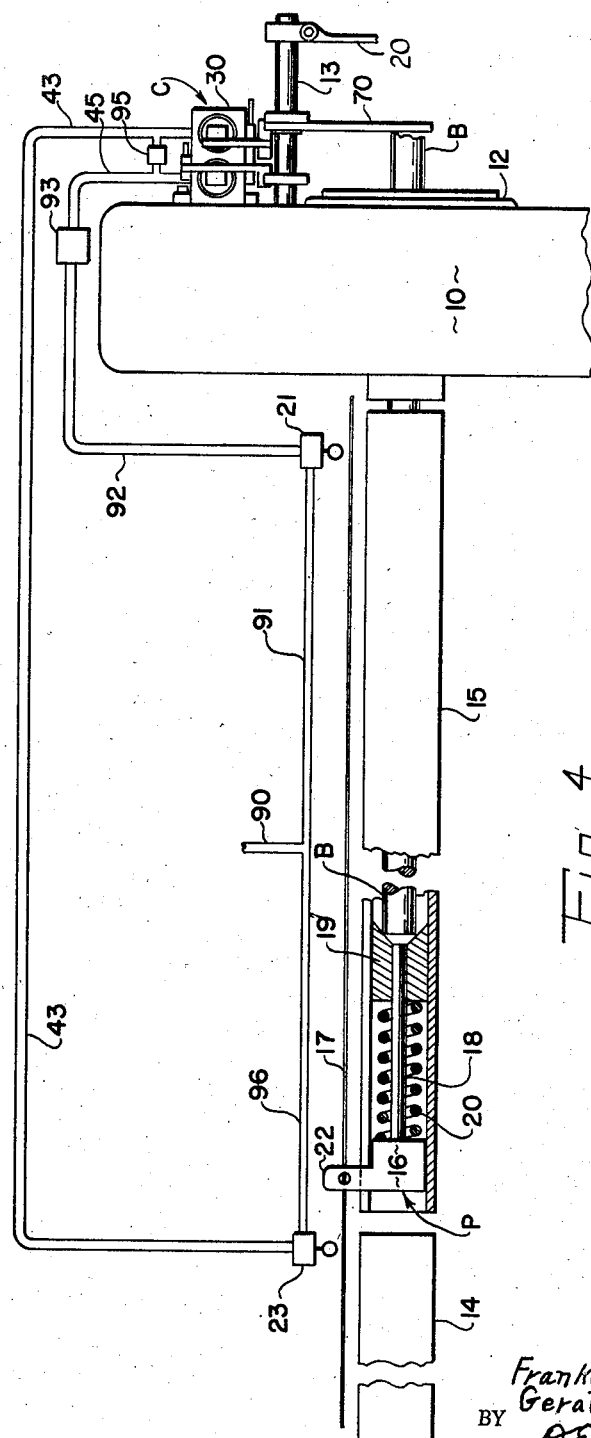

United States Patent Office 2,920,376
Patented Jan. 12, 1960

2,920,376
AUTOMATIC BAR WORKING MACHINE

Franklin D. Lakins, Nedrow, and Gerald B. Lanphere, Syracuse, N.Y., assignors to Lipe-Rollway Corporation, Syracuse, N.Y., a corporation of New York Application December 12, 1957, Serial No. 702,338

7 Claims. (Cl. 29—93)

This invention relates to apparatus used in conjunction with bar working and bar feeding machines.

Prior to this time, it was necessary in the use of a combined bar feeding and bar working machine set up to run through an extra machining cycle to cut up the bar remnant into two pieces so as to be able to eject a final bar remnant. This is necessary since it was impossible to move the bar or work stop out of position in order to eject the bar remnant when such a remnant was too short for a complete work piece plus a good collet grip but longer than the distance between the work stop and the collet face. This was so because there was no way of controlling the bar or work stop. It was automatically controlled by the bar working machine and moved into a bar stopping or engaging position with each advancement of the bar itself.

Accordingly, it is an object of this invention to provide a control unit for use in conjunction with a bar working and bar feeding machine set ups, whereby the bar remnant may be ejected when the remnant becomes too short for a good work piece plus a good collet grip.

In addition, it is an object of this invention to provide the bar working machine with a facing stop whereby the end of a fresh or new bar may be end faced prior to the commencement of the first cycle of machining operations.

The invention consists in the novel features and in the combinations and constructions hereinafter set forth and claimed.

In describing this invention, reference is had to the accompanying drawings in which like characters designate corresponding parts in all the views.

In the drawings—

Figure 2 is a side elevational view taken looking to the right, Figure 1.

Figure 3 is a fragmentary side elevational view shown partly in section of a portion of the invention.

Figure 4 is a schematic illustration of the control system of the control unit.

Briefly, the invention consists of a control unit mounted on the bar working machine in proximity to the rock shaft and spindle collet of the bar working machine. The control unit functions to hold a facing stop mounted on the rock shaft in inoperative position during or throughout the bar run, and permits the work stop to function normally until the bar is shortened to a length equal to one good work piece part plus a good collet grip. At this point, a signal is set up which permits the final work piece to be machined and cut off, and the work stop is then locked in an inoperative position by the control unit so as to permit ejection of the bar remnant. Upon return of the bar pusher in the bar feed guide bar tube to pick up a new or fresh bar, the facing stop is lowered, or released, to move into operative position whereby when a new bar is received in the bar feed guide tube and moved forwardly, the end of the new bar will strike the facing stop. The bar working machine is then permitted to operate in the normal manner so that the final cut-off operation serves to end face the new bar. As the rock shaft operates, the end or facing stop is returned to its upper or inoperative position by the rock shaft and the work stop is then left free to operate in the normal manner, that is, to move into position to stop the bar once each machining cycle.

Figure 1:
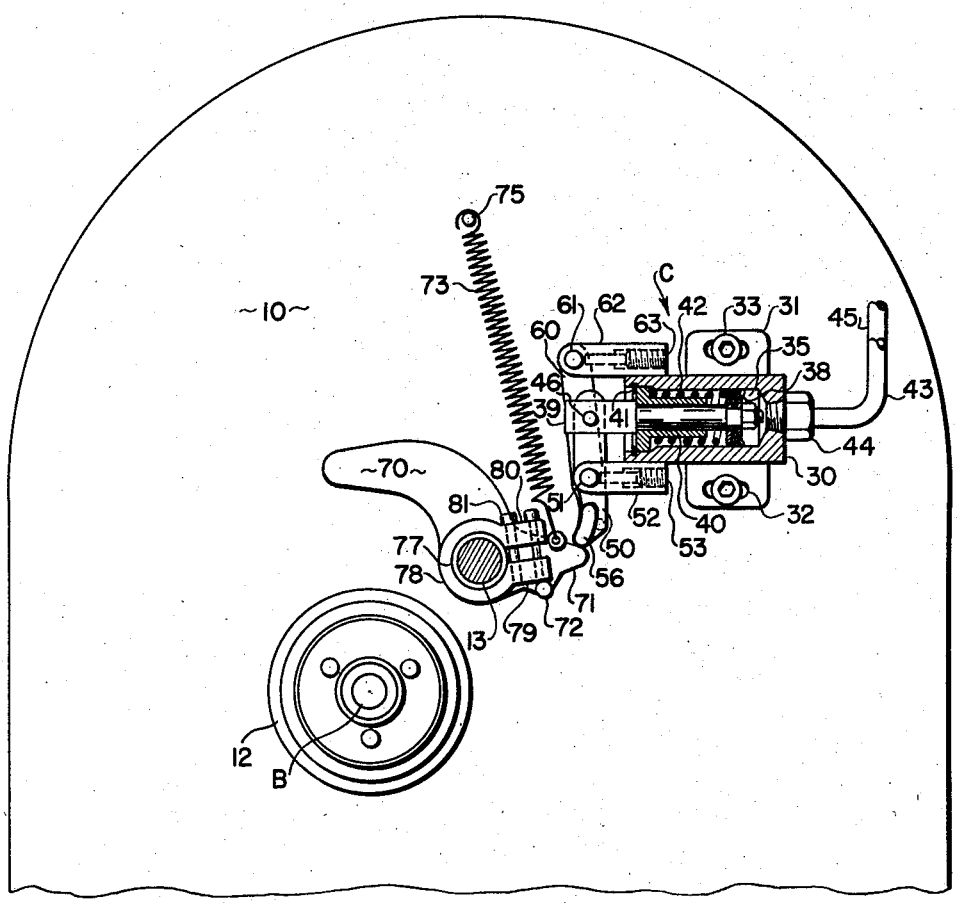
Figure 1 is a front elevational view, partially in section, of the control unit shown in operative position on the bar working machine.
Figure 5:
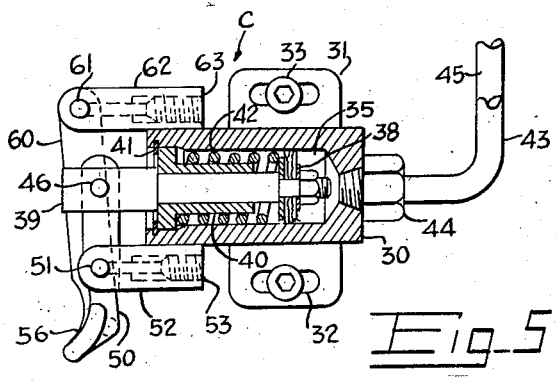
Figure 5 is an enlarged view of the control unit shown in Fig. 1.

In Figure 1, the bar working machine has been shown as having a head 10 in which the spindle collet 12 is positioned and carrying the bar stock B. Adjacent the spindle collet 12 is the rock shaft 13 and the control unit, generally indicated at C, is mounted on the face of the bar working machine head 10. Referring to Figure 4, a bar feed machine of the type disclosed in the patent to B. C. Harney, No. 2,595,522, issued on May 6, 1952, is shown in connection with the bar working machine. The bar feeding machine as here shown has a bar feed guide tube comprising a breech section 14 and a magazine section 15 in which a bar feed pusher, generally indicated at P of the type disclosed in the patent to B. C. Harney, No. 2,681,498, issued on June 22, 1954, is mounted for sliding reciprocatory movement in said guide tube.

The pusher comprises a flag 16 which is connected to a cable 17 which, in turn, is connected to the pusher driving motor (not shown). Rod 18 is connected to the flag 16 by any suitable means, and a cup-shaped bar pusher 19 is mounted in slidable relation on the rod 18. A coil compression spring 20 is mounted between the confronting faces of the flag 16 and serves to retain the cup-shaped pusher 19 in its forward position on the rod 18 so as to push the bar B forward in the guide tube when the pusher element 16 is moved by the cable 17, all of which is specifically disclosed in the Patent No. 2,681,498, above referred to.

Mounted on the outer end of the rock shaft 13 is a work stop 20 by means of a fastener 21, or any other suitable means. In normal operation, the rock shaft 13 operates to move the end of the work stop 20 into and out of axial alignment with the center line of the collet 12 and the bar B, so as to provide a stop for the bar B as the bar is moved through the collet 12 by the pusher P. When the bar B has been used up to a point where there only remains length enough for one good work piece plus one good collet grip, the valve 21, shown in Figure 4, is tripped by the finger 22 of flag 16. Another valve 23 is tripped by the finger 22 when the pusher P is returned to the breech section of the guide tube to pick up a fresh or new piece of bar stock B loaded in the magazine section 15. As will be described hereinafter, the valves 21 and 23 serve, through a suitable control system, to operate the control unit generally indicated at C.

The control unit C is made up of a cylinder block 30 mounted on a pad 31 which is suitably apertured at 32 to receive the fasteners 33 to affix the pad 31, and in turn the cylinder block 30, to the face of the head of the bar working machine 10. Formed in the cylinder block 30 are a pair of cylinders 35 and 36. The cylinders 35 and 36 and the piston structures therein are constructed in the same manner, and for purposes of illustration, the construction of the outboard cylinder 35, shown in Figure 1, will be described. Mounted in the cylinder is a piston 38 having a rod 39 affixed thereto. Mounted in the outer end of the cylinder chamber is a shouldered sleeve 40 by means of a snap ring 41. A coiled compression spring 42 is mounted in surrounding fashion about a sleeve 40 and impinges at one end upon the piston 38, and at its opposite end impinges upon the shouldered sleeve 40 to yieldingly urge the piston 38 inwardly. A fluid pressure line 43 enters the rear of the cylinder 35 by means of a coupler 44. A similar fluid line 45 enters the rear of the cylinder 36.

Referring to Figures 1 and 2, the outer end of the piston rod 39 of cylinder 35 is connected to the upper end of a lever 50 by means of a pin 46. The lever 50 is pivoted intermediate its ends on a pin 51 carried by a block 52 fixed to the under side of the cylinder block 30. The pin 51 is held against axial movement by a set screw 53. Since the pivot pin 51 is fixed, the lever 50 pivots about the pin 51 when the rod 39 is caused to be moved outwardly by the introduction of the fluid pressure into the cylinder 35. The lower end of the lever 50 is provided with a pair of laterally extending ears 55 and 56, see Figure 2, to be utilized for a purpose hereinafter described.

In a similar manner, a longer lever 60 is affixed by pin 47 to the rod 39 of the cylinder 36. The lever 60, however, moves about a fixed pivot 61 located in a block 62 above the connection between the rod 39 and the lever 60. The pivot pin 61 is fixed against axial movement in the block 62 by means of a set screw 63, as best seen in Figure 1. The lower end of the lever 60 is provided on its inner side with a laterally extending ear 65, and at its opposite side with a pin 66, for a purpose hereinafter described.

Referring now to Figure 1, a facing stop 70 is mounted on the rock shaft 13 for movement into and out of axial alignment with the center line of the spindle collet 12 so as to provide a stop for a new or fresh bar B when it is advanced by the bar feeding apparatus through the guide tube and the spindle of the bar working machine 10. The facing stop 70 is provided with a rearwardly extending tail portion 71 and a pin 72. A tension spring 73 is connected at one end to the tail portion 71 of the facing stop 70, and is connected at its opposite end to a fixed pin 75 so as to yieldingly bias the facing stop 70 toward a down or stop position. The facing stop 70 is mounted in freely rotatable fashion on a sleeve 77 which, in turn, is affixed to the rock shaft 13 for movement therewith. Mounted on the outer end of the sleeve 77 is a facing stop actuator 78 having a pair of rearwardly extending ears 79, 80, which are clamped together on the sleeve 77 by means of the fasteners 81 to affix the sleeve 77 and the actuator to the rock shaft 13. As best seen in Figure 1, the lower ear 79 contacts the pin 72 on the tail portion 71 of the facing stop 70 upon counter-clockwise movement of shaft 13.

Fixedly mounted on the inner portion of the rock shaft from the facing stop 70 is a stop collar 85. The stop collar 85 is formed with a pair of rearwardly extending ears 87 and 88 which are clamped together on a split sleeve 86 by means of a pair of bolts 89. As best seen in Figure 3, the ear 88 of the stop 85 extends rearwardly toward the control unit C a greater distance than does the ear 87, for a purpose to be hereinafter described.

The rock shaft 13, on which the work stop 20 is fixedly mounted, is operated by the bar working machine after the completion of each work piece. However, when the point is reached when it becomes necessary to eject the bar remnant, the work stop 20 must be locked up in an inoperative position out of axial alignment with the bar to permit ejection of the bar remnant. This is effected by the control unit C. By suitable control means, hereinafter described, the lever 60, which is normally in the position shown by the dash line in Figure 3, is moved outwardly to the full line position in order to latch the stop collar 85, and consequently the rock shaft 13, against counter-clockwise movement. This is set up in a timed relation so that when this latching occurs, the work stop 20 is in an up or inoperative position. The latching is effected by means of the ear 65 on the lower end of the lever 60 moving over the ear 88 of the stop 85, as seen in full lines in Figure 3. After the bar remnant has been ejected, the facing stop 70 is moved in alignment with the spindle collet 12 in order to position the new bar B for end facing by the cut-off tool of the bar working machine.

As best seen in Figure 1, the facing stop 70 is normally held in an up or inoperative position by the ear 56 on the lower end of the lever 50 engaging the tail 71 of the facing stop 70.

When fluid is admitted to the rear of cylinder 35, the lever 50 is moved counter-clockwise about its pivot 51, moving the ear 56 out of engagement with tail 71 to permit downward movement of the facing stop upon counter-clockwise movement of shaft 13, the follow up movement of the stop with the shaft being brought about by spring 73. This release movement of the latch lever 50 only occurs just prior to the initial advancement of a new stock bar.

Upon completion of the facing operation, the rock shaft 13 oscillates in a clockwise direction so as to move the ear 79 into engagement with the pin 72 on the tail of the facing stop 70, and consequently the facing stop 70 upward and out of operative position. At this time, the ear 56 on the lever 50 has also returned to its normal position so that the tail 71 is latched so as to fix the facing stop 70 in its upper and inoperative position. Since the rock shaft 13 has also been previously released, the fresh loaded bar, which has now been end faced, is now put through the cycle of machining operations to make the work pieces in a normal manner and the work stop 20 oscillates with the rock shaft 13 into and out of bar stopping position in the normal manner.

The control apparatus for effecting control of the control unit C to release the facing stop 70 and lock the rock shaft 13 in the manner previously set forth will now be described with reference to Figure 4. A valve 21 is positioned in the path of travel of the finger 22 on the flat 16 so as to be actuated at the point when there remains only sufficient bar stock in the apparatus to make one complete work piece plus a sufficient amount of bar length to give a good collet grip. When the valve 21 is tripped, fluid pressure from a source 90 enters the control unit C through the lines 91 and 92. The fluid pressure passes through a flow control and check valve 93 which slows the flow of fluid pressure a sufficient amount so as to permit the bar working machine to finish making the last work piece. When the last work piece has been completed, sufficient pressure has built up in the line 45 to the inboard cylinder 36. The admission of the pressure to the line 45 into the rear of the cylinder 36 acts upon the piston 38 thereof to overcome the spring 42 and move the piston 38 and rod 39 outwardly. This moves the lever 60 about the pivot pin 61 and the ear 65 on the lower end of the lever 60 moves into engagement with the ear 88 of the stop collar 85, so as to lock the rock shaft 13 and consequently the work stop 20 in an upward and inoperative position, so as to permit ejection of the bar remnant. The ejection of the remnant is effected by the continued forward movement of pusher rod 18 through the cup pusher 19 before the pusher P returns to pick up a new or fresh piece of bar stock B.

A bleeder exhaust valve 95, Figure 4, connects the lines 45 and 43 to atmosphere so as to slowly bleed the fluid pressure from the line 45 and cylinder 36 through the valve 95 to atmosphere. After the bar remnant has been ejected, the bar feed machine causes the pusher to be returned to the rear of the guide bar tube 15 so as pick up a freshly loaded bar. As the pusher element 16 moves toward the rear of the guide tube, finger 22 trips the valve 23 which admits fluid pressure from the source 90 to line 96, valve 23, line 43, to the rear of the outboard cylinder 35. The pressure entering the rear of the cylinder 35 moves the piston 38 and the rod 39 therein outwardly against the spring 42. Since the rod 39 of this cylinder is connected to the lever 50 above the fixed pivot pin 51, the lower end of the lever 50 will be caused to be moved rearwardly, thereby disengaging the ear 56 from the tail 71 on the facing stop 70, permitting the spring 73 to move the stop 70 about the rock shaft 13 and into axial alignment with the spindle collet 12 so that the freshly loaded bar B may be moved to engagement with the facing stop 70, as is shown in Figure 4. Simultaneously, the bleeding of the pressure from the cylinder 36 through the valve 95 has occurred to the point where the pressure on the rear of the cylinder 36 is no longer great enough to overcome spring 42 in order to hold the lever 60 in the position shown in full lines in Figure 3 and therefore, the collar 85 is released, thereby releasing the rock shaft 13 and consequently the work stop 20 for normal movement. Upon the first oscillation of the rock shaft 13 after the cut-off tool has end faced the stock bar B, the facing stop 70 will be moved to an upward position and latched under the ear 56 of the lever 50 by means of actuator 78 which coacts with the pin 72 on the tail of the work stop 70 to move the stop 70 about the rock shaft 13, to the upward and inoperative position. Thereafter, since the facing stop 70 is latched in inoperative position and because the lever 60 is moved to the rearward position out of engagement with the ear 88 on the actuator 85, the rock shaft 13 and work stop 20 mounted thereon are free to oscillate in a normal manner so as to position the bar for the machining operation upon each advancement of the bar, as is shown in Figure 2.

In order to insure return of the lever 60 to the normal position, indicated by the dotted lines in Figure 3, when the lever 50 is actuated, the pin 66 on the lower end of the lever 60 is positioned behind the ear 55 on the lower end of the lever 50. As will be obvious, when the lower end of the lever 50 is moved rearwardly by axial pressure in the cylinder 35, the ear 55 will contact the pin 66 to move the lever 60 and consequently the ear 65 out of engagement with the ear 88 on the actuator 85, thereby insuring the release of rock shaft 13.

It will therefore be seen that by our invention, we have provided a control unit which gives several advantages to bar feeding and bar working machine set ups. Primarily, there is no need in our invention for the bar working machine to run through an extra machining cycle so as to cut up the bar remnant in order to permit ejection. In addition, we have minimized the changes of breaking machine tools since there is no machining of parts shorter than the complete work piece.

What we claim is:

1. An automatic bar working machine operable through repeated machining cycles to make parts from stock bars, a bar feed for advancing a stock bar to said machine, said machine including a rock shaft operable to move a work stop into the path of movement of the stock bar for registration with the stock bar upon each advancement thereof, a facing stop mounted on said shaft and movable into and out of bar stopping position, latch means for normally holding said facing stop out of bar stopping position, and means operable only upon the initial advancement of a stock bar for releasing said facing stop.

2. An automatic bar working machine operable through repeated machining cycles to make parts from stock bars, a bar feed for advancing a stock bar to said machine, said machine including a rock shaft operable to move a work stop in registration with the stock bar upon each advancement thereof, a facing stop mounted on said shaft and movable into and out of bar stopping position, latch means for normally holding said facing stop out of bar stopping position, and means operable only upon the initial advancement of a stock bar for releasing said facing stop, a seconud latch means operable to latch said work stop out of registration with the stock bar during ejection of the remmant thereof.

3. A bar working machine having a spindle collet, a bar stock feeding apparatus for feeding bar stock through the spindle and collet of the bar working machine, said bar feeding apparatus including a stock bar guide tube and a bar pusher movable forwardly through said guide tube to feed the bar stock through the collet and, upon exhaustion of a bar, said pusher being movable rearwardly of the guide tube for insertion of a new bar in the tube, a rock shaft journalled for oscillation in said bar working machine and having a portion in proximity to said collet, a work stop fixedly secured to said shaft and being movable into and out of bar engaging position upon oscillation of said shaft to provide a work stop upon each advancement of the bar stock, a facing stop mounted on said rock shaft intermediate said work stop and the collet and being movable into and out of bar engaging position, means yieldingly urging said facing stop into bar engaging position, first latch means movable into and out of latching engagement with said rock shaft and operable upon engagement with said rock shaft to latch the same against oscillation, and second latch means operable to lock said facing stop against movement into bar engaging position, latch control means operable upon said stock bar pusher approaching the end of its forward movement, to move said first latch in latching engagement with said rock shaft to permit ejection of the remnant upon further movement of the bar pusher, and said control means being also operable when the pusher has completed its return stroke to cause said latches to release said rock shaft and facing stop to thereby effect movement of the latter into bar engaging position upon the advancement of a new bar through said guide tube, said rock shaft having means coacting with said facing stop to move the same out of bar engaging position and into locked position when said rock shaft is oscillated to move said work stop out of bar engaging position.

4. A bar working machine having a spindle collet, a bar stock feeding apparatus for feeding bar stock through the spindle and collet of the bar working machine, said bar feeding apparatus including a bar stock guide tube and a bar pusher movable forwardly through said guide tube to feed the bar stock through the collet and upon exhaustion of the bar stock said pusher being movable rearwardly of the guide tube for insertion of a new bar into the tube, a rock shaft journalled for oscillation in said bar working machine and having a portion in proximity to said collet, work stop means being movable into and out of bar engaging position to provide a work stop upon each advancement of the stock bar, a facing stop mounted on the rock shaft, said facing stop normally latched out of bar engaging position and being movable into and out of bar engaging position, means yieldingly urging said facing stop into bar engaging position, first latch means movable into and out of latching engagement with said rock shaft and operable upon engagement with said rock shaft to latch the same against oscillation, and second latch means operable to release said facing stop for movement into bar engaging position, latch control means operable upon said stock bar pusher approaching the end of its forward movement to lock said work stop means out of position to permit ejection of the bar remnant upon further movement of the bar pusher, said control means also being operable when said pusher has completed the return stroke to cause said second latch means to release said facing stop to effect movement of said facing stop into bar engaging position upon the advancement of a new bar through said guide tube, said rock shaft having means for coacting with said facing stop to move the same out of bar engaging position and into said normally latched position when the rock shaft is oscillated.

5. In a bar feeding and bar working machine set up, said bar working machine including a spindle, collet and rock shaft, a control unit mounted on said bar working machine adjacent said rock shaft, said unit being operatively associated with said rock shaft and being controlled by said bar feeding machine to permit ejection of an exhausted piece of bar stock remnant and end facing of a fresh piece of bar stock, said control unit operating to temporarily lock said rock shaft against oscillation when a work stop mounted on said shaft is in an inoperative position to permit said remnant ejection, and said unit further operating to release a facing stop freely rotatably mounted on said rock shaft, said facing stop being yieldingly urged to an operative position to position a fresh bar for end facing, and being normally latched in an inoperative position, said rock shaft having means coacting with said facing stop to return said facing stop to the inoperative position upon oscillation of said rock shaft after said fresh bar has been positioned for end facing.

6. A control unit for use in connection with a bar feeding and bar working machine set up, said bar working machine including a collet and a rock shaft, said unit being mounted adjacent said rock shaft and comprising a cylinder block formed with a pair of cylinders therein, said cylinders having pistons mounted for reciprocation therein, said pistons being pivotally connected to inner and outer levers, said inner lever moving about a fixed pivot point above its piston connection and said outer lever moving about a fixed pivot point below its piston connection, said pistons being yieldably urged to the rear of said cylinders and being moved forward under fluid pressure, an axially adjustable work stop fixedly mounted on the outer end of said rock shaft for oscillation therewith, a facing stop mounted in freely rotatable fashion on said rock shaft intermediate said work stop and said collet, said facing stop being normally latched in an up inoperative position and being yieldably urged to a down operative position, a rock shaft actuator being mounted for oscillation on said rock shaft intermediate said facing stop and said collet, said inner and outer levers being formed at their lower ends with ears, said ear on said outer lever normally latching said facing stop in its up position, said ear on said inner lever normally positioned out of the path of oscillation of said actuator, switch means positioned on said bar feed machine and adapted to be actuated in timed sequence whereby to supply fluid pressure to said cylinders to move said inner lever to a position where it locks said rock shaft and said work stop against oscillation in an inoperative position to permit bar remnant ejection and to release said facing stop upon insertion of a fresh bar in said bar feeding machine to position said bar for end facing, and means interconnecting said inner and outer levers whereby when said outer lever releases said facing stop, said inner lever will be moved rearwardly to release said rock shaft for oscillation, and means on said rock shaft for returning said facing stop to its inoperative latched position upon oscillation of said rock shaft.

7. Apparatus for use in connection with bar feeding and bar working machines wherein said bar working machine includes a collet and a rock shaft, said apparatus including means for rendering said rock shaft inoperative in order to latch a work stop in an inoperative position to permit ejection of a bar remnant, means for moving a facing stop into axial alignment with said collet to position a fresh piece of bar stock for end facing, and means for operating said previously mentioned means in timed sequence to the loading of a fresh bar in said bar feeding machine and to the exhaustion of said bar in said bar working machine to the point where a non-usable remnant remains.

References Cited in the file of this patent
UNITED STATES PATENTS

| | | |
|---|---|---|
| 2,729,879 | Sampson | Jan. 10, 1956 |
| 2,742,656 | Fisher | Apr. 24, 1956 |